United States Patent [19]
Prye

[11] 3,785,631
[45] Jan. 15, 1974

[54] PARTING AND BEVEL BURNING DEVICE

[76] Inventor: Stanley Peter Prye, 2222 Brandard, Houston, Tex. 77006

[22] Filed: Oct. 24, 1972

[21] Appl. No.: 299,642

Related U.S. Application Data
[63] Continuation-in-part of Ser. No. 108,008, Jan. 20, 1971, abandoned.

[52] U.S. Cl. .......... 266/23 K, 266/23 L, 266/23 M, 33/32 B
[51] Int. Cl. ............................................. B23k 7/10
[58] Field of Search ...................... 266/23 F, 23 HH, 266/23 K, 23 L, 23 M, 23 R; 33/32 B, 32 C, 32 R, 41 R, 18 R

[56] References Cited
UNITED STATES PATENTS
3,028,154  4/1962  Johnson ......................... 266/23 HH

*Primary Examiner*—Gerald A. Dost
*Assistant Examiner*—Paul A. Bell
*Attorney*—William E. Ford

[57] ABSTRACT

The disclosure is to a device which can be employed in combination with a welding torch fixed therein in a predetermined position and direction, the device being adapted to be moved, carrying the torch therewith, in straight line direction, or to be swung in cutting with a predetermined radius. The device, as used in straight line parting or beveling, may be fixed to a structural member that is to be beveled or parted, or otherwise cut in any predetermined manner. To cut a circle or arc, the device is adapted to be magnetically or otherwise mounted on the plate or shape thus to be cut.

10 Claims, 4 Drawing Figures

PATENTED JAN 15 1974  3,785,631

3,785,631

PARTING AND BEVEL BURNING DEVICE

BACKGROUND OF THE INVENTION

This application is a continuation-in-part application of application Ser. No. 108,008, and now abandoned, filed Jan. 20, 1971 for PARTING AND BEVEL BURNING DEVICE. An unexpired, uninfringed cutting device U.S. Pat. No. 3,028,154, issued to J.B.Johnson on Apr. 3, 1962. This device discloses a vertically supported, mechanically rotated yoke that mounts linkage means and a clamp for a cutting torch, the torch being swingable in adjustment only in a vertical plane.

The earliest activity in this field of clamping to structural shapes, was Leighty U.S. Pat. No. 1,327,715, issued Jan. 13, 1920, in form of a device clamped to a railroad rail for drilling holes through the webs of railroad rails. The device was not tracked and had to be removed and re-clamped each time a new hole was to be drilled.

Shortly thereafter, when oxy-hydrogen, and oxy-acetylene gases were first used, brought forth Gas Burner Holder U.S. Pat. No. 1,372,145 issued Mar. 22, 1921, to Klahre and Kleinschmidt, for a torch holder to be affixed to railroad rails, the rails appearing as track means for straight line movement, not elaborated upon.

Other early prior art included Stevens et al. U.S. Pat. No. 1,565,824, issued Dec. 15, 1925, to a device for supporting oxy-acetylene torches, as to burn the webs of railroad rails. Again this was an untracked clamp.

In the course of the increase in the scope of welding operations, and the usage of welding in an ever expanding field of application, the need for a torch has developed which first provides linkage and clamp means to permit arrangement to point the burning flame of the torch in any direction, and at any angle. Then the need arises for such device to be tracked as for straight line, or circular cutting. The applicant has arrived at a device that satisfies these requirements, while further providing smooth and even cutting.

SUMMARY OF THE INVENTION

The invention relates to welding torch clamping and universally and angularly direction of the torch burning flame, while at the same time the device may be tracked for even and smooth cutting; also the device may be manually tracked in a circular path for circular or arcuate cutting.

As a primary object the invention relates to welding torch clamping and universal selection of cutting torch burning flame direction, for both straight line and/or circular or arcuate cutting.

It is also another object of the invention to provide a device of this class which is tracked for straight line movement, after it has first been directed or pointed by parts which, taken together, provide universal movement of the welding torch for selective pointing of the torch burning flame.

It is still a further object of the invention to provide a device of this class which may be radially clamped to, or removed from, any type of structural shape, while at the same time permitting tracked movement after cutting direction has been set.

Other and further objects will be apparent when the hereinbelow set forth specification is considered in connection with the drawings.

BRIEF DESCRIPTION OF THE DRAWINGS

In the accompanying drawing forming a part of this application, like reference numerals will be applied to like elements in the various views.

BRIEF DESCRIPTION OF THE INVENTION

The invention is to a tracked holder for a welding torch or cutting torch, the holder mount being slidable upon track means which have end member clamped to structural shapes, as I-beams. Thus the torch can be universally adjusted to direct the cutting torch held by a clamp comprising the outermost element thereof in manner that it will cut the structural shape at any desired angle, as, for instance, at a 45° bevel.

The device rotatably mounts a gooseneck or substantially right angled member as the first element supported by the holder mount or slide bar, this element being rotatably by means housed in the holder mount or slide bar, and in a horizontal plane with axis of rotation extending vertical. From the gooseneck a succession of bar and/or yoke elements are connected with pivots transversely thereacross or in horizontal planes, whereas the clamp that holds the cutting torch nozzle is pivotally mounted on an outermost rod member, whereby the direction of flame may be universally pointed in direction.

The end members of the slide ways are in themselves clamps that clamp to opposed parts of the structural object being worked upon. Also such clamps are designed with the object of permitting easy installation and removal. The means for permitting rotation of the gooseneck is installable in the holder mount or slide bar and gooseneck rotation can be prevented by a setscrew. For cutting circles a shorter based embodiment is required, with gooseneck freely rotatable during cutting.

DESCRIPTION OF SPECIFICATION EMBODIMENTS

Figure 1:
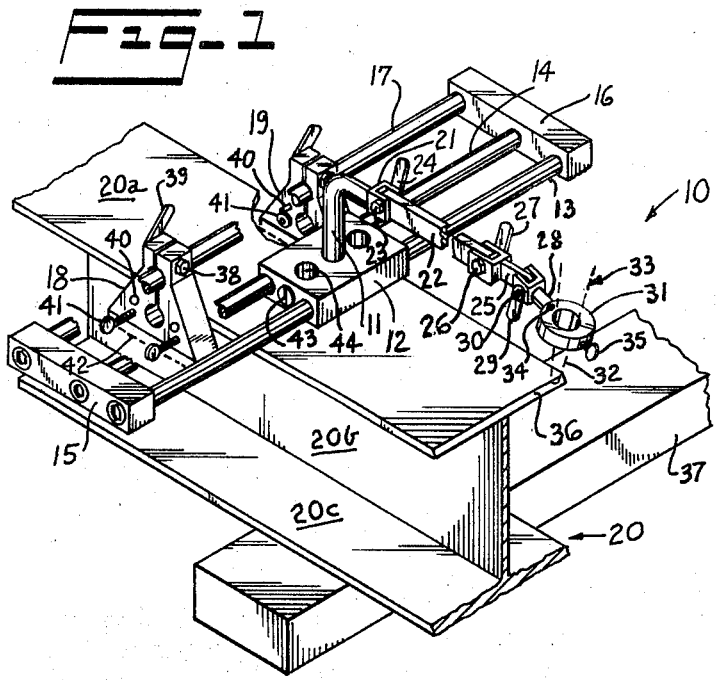
FIG. 1 is an isometric view showing an embodiment of the device with cutting torch directed to burn the upper flange of an I-beam at a predetermined beveled angle.

A parting and beveling device or adjustable tracked holder and cutting torch 10 is shown in FIG. 1 as comprised of a gooseneck 11 upstanding from the holder mount or slide block 12 slidable transversely on ways 13 and 14, in form of round stock bars or rods. The ends of the slide ways 13 and 14 may be of reduced diameter and press-fitted into terminal header bars 15 and 16. Also a rear or third way or slide rod 17, parallel with the ways 13 and 14, may be similarly carried as mounted at ends in the headers 15 and 16.

Two oppositely facing slide clamp brackets 18 and 19 are slidably mounted on the third way or rod 17, constructed in manner to be quickly and readily clamped to opposed sides of the work to be burned, or to an object that is fixed in adjacent relation to the work, the bracket clamps or clamp brackets to be described in detail hereinbelow. As shown in FIG. 1, these clamp brackets 18 and 19 are affixed to the opposed edges of the upper flange 20a of an I-beam 20.

The upper, substantially horizontally extending leg of the gooseneck 11 terminates outwardly in a yoke 21. A linkage bar 22 has its inner end pivotally mounted across the yoke 21, a pivot bolt 23 passes through one wing of the yoke 21, through the linkage bar 22, through the outer wing of the yoke 21, and its end opposite the bolt head being threaded, and having washers thereon, not shown, with a clamp lever 24 being threaded upon the threaded end of the pivot bolt 23, to bear against the outermost washers, thus to fix the pivot linkage bar 22 against motion with relation to the gooseneck 11 after the linkage bar 22 has been disposed in desired position. In like manner a yoke bar or linkage member 25, with yoke on inner end, may be pivotally connected to the outer end of the linkage bar 22 as mounted on pivot bolt 26, with linkage member 25 and linkage bar 22 then fixed with relation to each other by tightening a clamp lever 27.

In corresponding manner, a yoke rod 28, with shank of round bar or rod stock, is pivotally connected to the outer end of the yoke bar or linkage member 25, as by a pivot bar, as hereinabove described, and when in desired pivoted position, the yoke rod 28 is fixed in relation to the yoke bar 25, as by tightening a lever clamp 29. In this case the lever clamp 29 is shown oppositely of the lever clamps 24 and 27, no washers are shown, and the threaded end of the pivot bolt 30 is shown with the clamp lever 29 threaded thereupon. The outer end of the yoke rod 28 is received in a bore, not shown, with rotating fit clearance into the periphery of an annular clamp or ring holder 31, the nozzle 32 of a burner, welding torch or cutting torch 33 being shown in broken lines as received through the annular clamp or torch holder ring 31. When the annular clamp 31 has been rotated to desired position on the yoke rod 28, a setscrew 34 in the top surface of the clamp ring 31 is tightened to lock the clamp ring 31 against rotation with relation to the yoke rod 28. Also, when the cutting torch nozzle 32 is properly disposed through the annular clamp or ring 31, a wing screw 35 is tightened through the clamp ring 31 and against the nozzle 32 to anchor the welding torch 33 into desired fixed position and pointed in desired direction.

In the illustration of FIG. 1, the burner or cutting torch 33 is shown with linkage bar 22, yoke bar 25 and yoke rod 28 so directed, and with the clamp ring 31 so rotated on yoke rod 28, that a 45° bevel 36 is to be cut straight along the forward edge of the upper flange 20a of the I-beam 20. The clamps 18 and 19 at this point have been fixed with relation to the clamp slide bar 17, and to the opposed edges of the I-beam upper flange 20a, in the following manner.

The I-beam 20, comprising the upper flange 20a, the web 20b and the lower flange 20c is positioned on a work bench or saw horse, as represented by the board 37 in FIG. 1. The clamps 18 and 19 have been fabricated from thick plate or block stock.

The clamps 18 and 19 are first machined to shapes in cross-section triangular at base with rectangle superimposed upon upper portion, then bored along a vertical center line with spaced apart upper and lower transverse bores, then slit transversely with a vertical slit centrally downward from top through upper and into lower bore. At least the upper bore is of such predetermined diameter with relation to the third way or rod 17 that, with the rod 17 received through the upper bore, or with the clamps slidably installed on the rod 17, a bolt 38 may be passed longitudinally from front to rear above the upper bore of a clamp 18 or 19, and a clamp lever 39 threaded upon the rear, threaded end of the bolt 38 and tightened, and a tight clamping of the clamps 18 and 19 can be effected. Thus, as shown in FIG. 1, with the clamps 18 and 19 spaced apart a predetermined distance, longitudinally spaced apart pins 40 may rest upon the upper surface of the work, as upon the surface of the upper flange 20a, while wing clamp pins below tha small pins 40, and threadable transversely through the third way clamps 18 and 19, will bear against the side edges of the I-beam upper flange 20a, and by this means the wing clamp pins 41 will effectuate a positive clamping of the device 10 to the I-beam or work 20.

In the case of work of certain shapes, and in cases where it may be desired to cut or burn along lines not straight across, but at angles to the longitudinal or transverse axis of the work or structural shape, the clamps 18 and 19 may be employed without the pins 40 or wing clamp pins 41 being placed in function. In this case magnetic plates 42, shown in broken lines in FIG. 1 as disposed upon the bottoms of the clamps 18 and 19, may serve to hold the device 10 for operation at whatever cutting angle desired.

Figure 2:
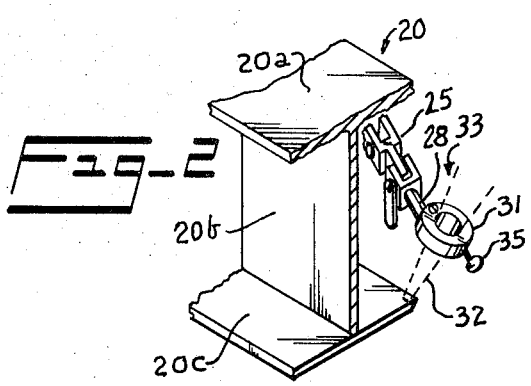
FIG. 2 is a fragmentary isometric view showing the device with the cutting torch directed to burn the lower flange of an I-beam, as the I-beam shown in FIG. 1, at a reverse predetermined angle.

As shown in FIG. 2, when it is desired to cut on the lower flange 20c of the I-beam 20, as to cut a straight line reverse bevel of 45°, or easier, to cut a vertical edge line, all that is necessary is to loosen the wing clamp pins 41 in one of the clamps 18 or 19, resulting in permitting the device 20 to be moved, as outwardly along the upper flange 20a to be reset some bit nearer the outer end of the I-beam, and the clamps 18 and 19 set again at a predetermined distance nearer the end of the beam than shown in FIG. 1. Then, with the lever clamps 24, 27 and 29 loosened, the respective linkage bar 22, yoke bar 25 and yoke rod 28 may be changed in angle to the horizontal (or vertical), thus to attain the position of the yoke bar 25 and yoke rod 28 shown in FIG. 2. Also, with the set screw 34 loosened, the torch holder ring 31 may be swiveled about the yoke rod 28 to a predetermined desired position. Obviously the respective lever clamps are then tightened, also the set screw 34. Additionally, with the wing screw 35 loosened, the cutting torch nozzle 32 may be directed as desired, and then the wing screw 35 tightened to hold such nozzle 32 as directed.

It can be assumed in FIG. 1 that the upright leg of the gooseneck 11 can be swiveled or swung in the slide block 12, and set by a sidewardly passed setscrew, not shown. In such construction it is obvious that the bore in which the gooseneck upright leg swivels does not reach to the bottom of the slide block 12. As the slide block 12 is slid along the ways 13 and 14 to carry the torch 33 in straight line cutting, bores 44 are shown passed downwardly through the upper surface of the slide block, to communicate with passages therein to carry lubricant to the ways 13 and 14, and to the lower leg of the gooseneck 11. A non-metallic bumper button 43, is shown in FIG. 1, with an oppositely disposed bumper button, not shown, also being provided, these buttons being backed by inner springs, not shown, thus the buttons prevent metal to metal contact at the end of cutting travel in the form of invention shown in FIG. 1, and may be features in other embodiments also.

Figure 3:
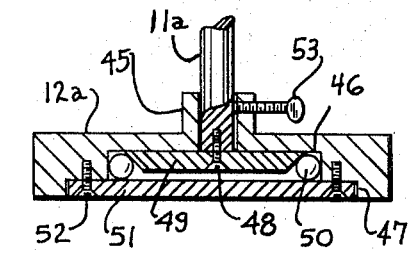
FIG. 3 is a cross-sectional view through the slidable holder mount, showing means for rotating the gooseneck or first holder member or element.

A means of providing facile handling of gooseneck swivel or rotation, which may be employed with any embodiment of the invention, is shown in FIG. 3, the slide block 12a being bored centrally through its collar 45 and successively counterbored to provide a ball bearing and wheel recess 46, and a closure plate recess 47. the upright leg of a gooseneck 11a extends downwardly through the collar 45 and a countersunk head screw 48 connects a beveled edge wheel 49 to the bottom of the gooseneck upright. Opposed ball bearings 50, best representative of a race of ball bearings, are shown outwardly of the wheel 49, the ball bearings 50 being retained by a closure plate 51 disposed in the recess 47 and affixed to the slide block 12a by countersunk head machine screws 52. A wing screw 53, passed sidewardly through the collar 45 immobilizes the gooseneck 11a against swiveling or rotation.

Figure 4:
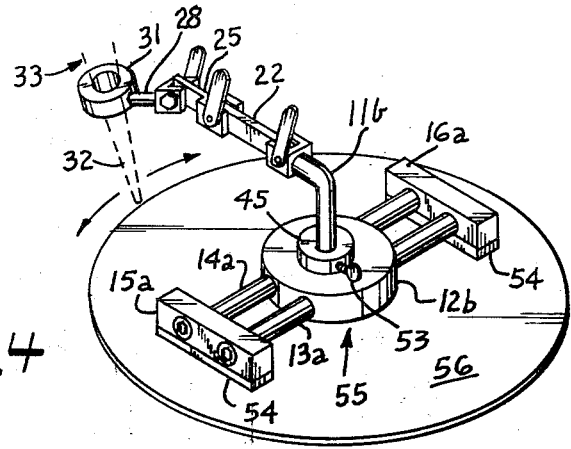
FIG. 4 is an isometric view of another embodiment of the device, with the torch directed to cut out a circular plate.

An embodiment of the invention is shown in FIG. 4 which is adapted to hold the device centered within, and affixed to a plate to be cut in a circle. In this device 55 a round slide mount 12b is mounted to slide on shortened ways 13a and 14a, with header bars 15a and 16a having magnetic plates 54 on the under faces thereof. A gooseneck 11b may be mounted to swivel or rotate, preferably as shown in FIG. 3, but otherwise as indicated and described in FIG. 1. As in FIG. 3, a wing screw 53 is shown passed sidewardly to immobilize the gooseneck 11b from movement when the device is not in use to cut circles, a collar 45 as shown in FIG. 3 receiving the wing screw 53. The linkage bar 22, yoke bar 25, yoke rod 28 and clamp ring 31 and associated pivot means, clamp means and anchorage and releasing means are the same as shown in detail in FIGS. 1 and 2, and hereinabove described. With the set screw or wing screw 53 loosened, and the torch nozzle directed at a predetermined radius from center of gooseneck upright, and to cut a bevel cut or at right angle to plate surface as desired, the gooseneck 11b can be swiveled or rotated as the torch cuts out a circular plate 56, the magnets 54 holding the device fixed.

Noticeably, in all of the forms of the invention, the linkage bar 22 does not provide a yoke at either end. The yoke 24 on the upper, horizontally extending leg of the gooseneck 11 in FIG. 1 is the outermost part of this element, while in the yoke bar 25 and yoke rod 28, the yoke is the innermost member thereof. This is by purpose, as the linkage bar 22, the simplest part, is and should be that part which is designed for interchangeability as to length. Thus, for example, when work is being done in limited space, and on short or small work parts, limited length of radius from gooseneck upright axis at top surface of slide block to point of flame emanation from cutting torch nozzle is required. Thus a short linkage bar 22 may be employed. On the other hand, with a long direct radial distance required from the critical gooseneck point to point of flame emanation from torch, as in FIG. 2, a relatively long linkage bar 22 may be required to reach this radial distance, especially when relatively large work parts, as large size structural members are being worked upon. In any case universal adjustment is obtainable as the gooseneck swings about a vertical axis, the parts between gooseneck and torch nozzle clamp pivot in substantially vertical planes around transverse axes, while the torch nozzle clamp ring is rotatable about the yoke rod.

The forms and embodiments disclosed are not defining limitations, but the broad spirit of invention hereinabove introduced goes to other structural arrangements, variations and modifications that offer corresponding universality of adjustment. The appended claims are by way of example and introduction, and are not by way of limitation.

I claim:

1. A parting and beveling device comprising a holder mount for a holder assembly including a gooseneck supported by said mount for rotation about a vertical axis and having a yoke disposed above said mount and horizontally outermost, a linkage bar with inner end pivotally mounted on a transverse axis through said gooseneck yoke, a succession of yoke members pivotally connected by yokes innermost and providing transverse pivot axes including a transverse pivot axis provided by the innermost of said yoke members on which the outer end of said linkage bar is pivotally mounted, the outermost of said yoke members providing a pivot rod, and a clamp swingably mounted to rotate about said pivot rod to hold the nozzle of a burning torch directed angularly in three dimensions when said preceding holder assembly members are clamped rigidly by holder assembly included clamp means, holder mount support means including a plurality of parallel extending slide ways, with ways slidably mounting said holder mount thereon, said holder mount support means inlcuding means to affix to work structures or in fixed adjacency with work structures to be burned by said torch.

2. A parting and beveling device as claimed in claim 1, in which said holder mount is adapted to release said gooseneck to be swung about a vertical axis in operation whereby to cut out a round plate.

3. A parting and beveling device as claimed in claim 2, in which said holder mount support means includes magnetized means to hold said holder support means rigid with relation to work while it is being burned by said torch.

4. A parting and beveling device as claimed in claim 1, in which said linkage bar is selectively of various lengths.

5. A parting and beveling device as claimed in claim 1, in which said holder mount support means includes three parallel ways header mounted at each end, with said holder mount slidably mounted on two of said ways to carry said holder assembly including torch held thereby in straight line burning, and clamp means slidable on said third way into position to be fixed to, or in rigid adjacency with the work to be burned, as aforesaid.

6. A parting and beveling device as claimed in claim 1, in which said holder mount support means includes three parallel ways header mounted at each end, two ways carrying said holder mount slidably therealong, and a third way carrying clamps immobilized for work clamping but carrying magnetized means on the bottoms of said clamps to affix said holder mount support means with relation to the work to be burned.

7. A parting and beveling device as claimed in claim 1, in which said gooseneck carried a wheel on the bottom thereof and mounted on anti-friction means for rotation within said holder mount.

8. A parting and beveling device as claimed in claim 7, in which a bottom closure plate flush with the bottom of said holder mount retains said anti-friction means to bear in operation against said wheel.

9. A parting and beveling device as claimed in claim 2, in which said holder mount includes a collar centrally on top thereof through which said gooseneck extends vertically upwardly, and set screw means passed sidewardly through said collar and withdrawable from gooseneck contact as said means adapted to release said gooseneck.

10. A parting and beveling machine as claimed in claim 1, in which said holder assembly included clamp means inlcudes a set screw passed through said clamp ring to clamp said pivot rod to said clamp ring.

* * * * *